Figure 1:
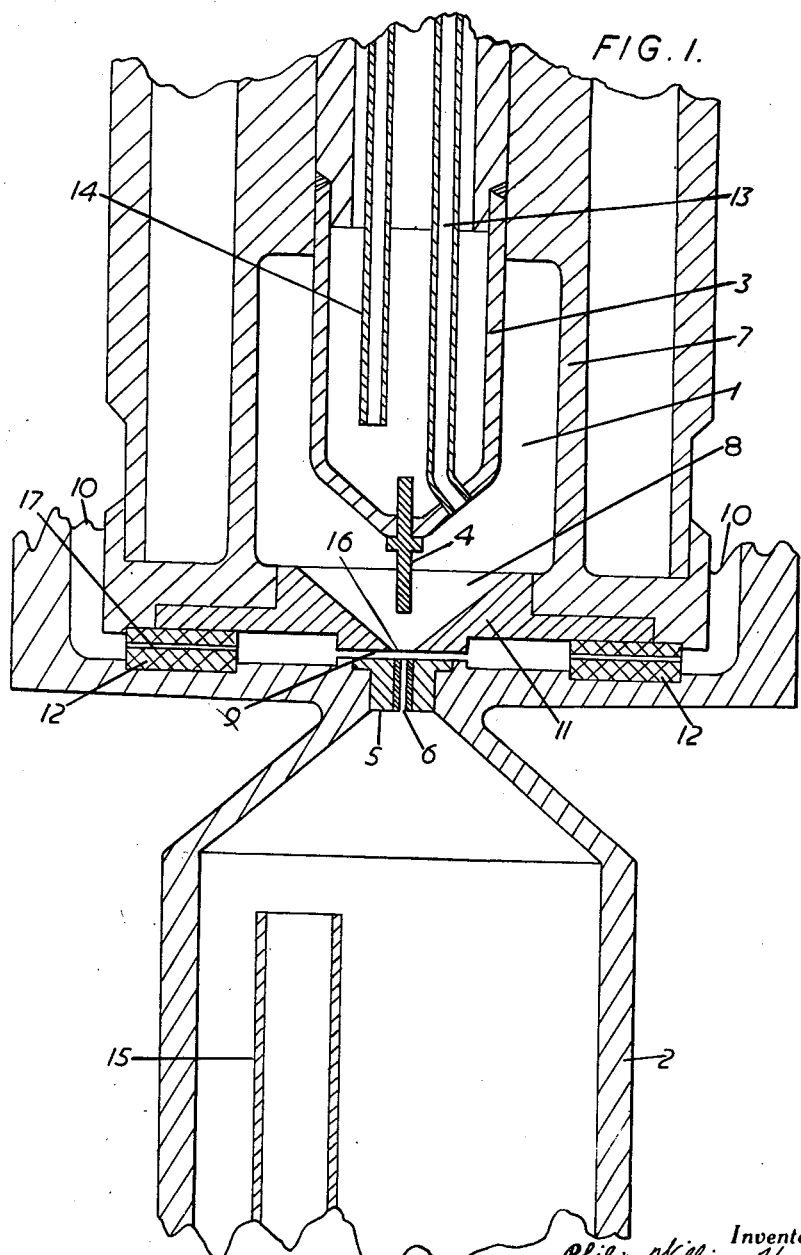

Feb. 16, 1965 P. W. YOUNG ETAL 3,169,914
METHOD AND APPARATUS FOR CONDUCTING GASEOUS REACTIONS
Filed Aug. 17, 1960 2 Sheets-Sheet 1

Inventors
Philip William Young
George Ingle Finch
By
Cushman, Darby & Cushman
Attorneys

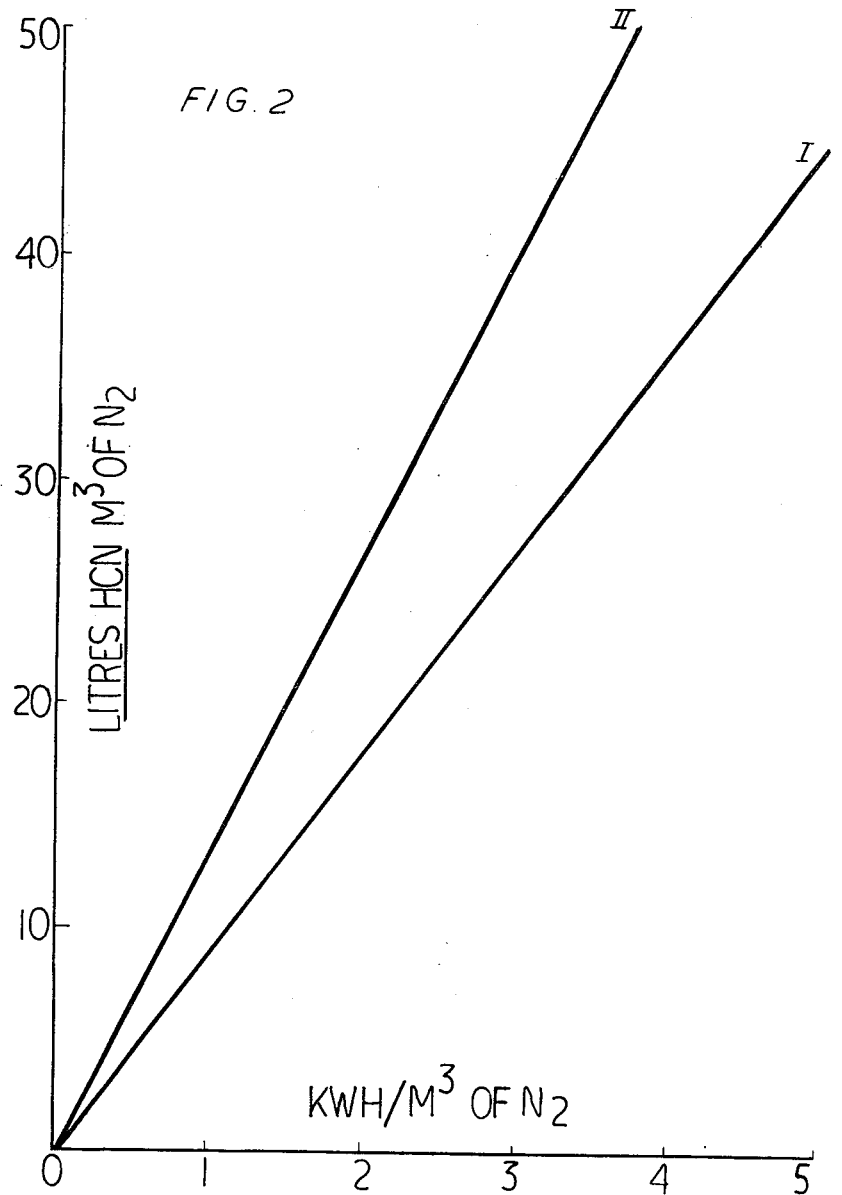

United States Patent Office 3,169,914
Patented Feb. 16, 1965

3,169,914
METHOD AND APPARATUS FOR CONDUCTING GASEOUS REACTIONS
Philip William Young, Norton-on-Tees, England, and George Ingle Finch, Two Trees Farmhouse, Upper Heyford, Oxfordshire, England; said Young assignor to Imperial Chemical Industries Limited, London, England, a corporation of Great Britain
Filed Aug. 17, 1960, Ser. No. 50,149
Claims priority, application Great Britain, Aug. 26, 1959, 29,257/59
6 Claims. (Cl. 204—164)

The present invention relates to gaseous chemical reactions.

According to the present invention gaseous reactions are conducted by subjecting a gas or mixture of gases to an electric discharge in a zone employing at least one electrode having an internal nozzle which is in direct communication with a reaction chamber, feeding a stream of gas towards the discharge from all sides, preferably perpendicularly to its axis, in close proximity to the inlet end of the nozzle whereby the discharge is pinched in the neighbourhood of the nozzle and its temperature is thus increased, jetting the products of the discharge through the said nozzle into the reaction chamber and effecting a reaction there. The reaction chamber may, and usually does, contain a gas with which the discharge products are to be reacted.

The stream of gas used to produce the pinch effect may be fed towards the discharge in a zone, e.g. of flat cylindrical shape, surrounding the discharge and may be introduced to this zone by any convenient means, e.g. by a cylindrical annulus in communication with it.

Both electrodes may have an internal nozzle, or preferably only one is of this sort. An advantage of the nozzle being in the anode is that owing to less wear of the anode the shape of the nozzle is preserved longer. It is desirable that the electrode which has no nozzle, usually the upper one, be cooled and this can be done, for example, by setting the electrode tip in the bottom end of an electrode assembly comprising a hollow cylinder of conducting metal having internal inlet and outlet tubes for a circulating coolant, e.g. water. The other electrode should also be cooled, e.g. by external cooling means.

If the reactant gas contains oxygen or other oxidising gas, the life of the electrodes could be seriously decreased. For this reason it is desirable to enclose the upper electrode in a blanket of gas, which can be accomplished by surrounding that electrode with a cylindrical chamber and feeding thereto a gas inert to the electrodes through a tube situated in the said electrode assembly.

Advantageously this chamber is prolonged downwardly into a frusto-conical space with its apex directed towards the nozzle of the second electrode. Between the bottom, that is the narrow, end of the frustum and the nozzle is the flat cylindrical zone in which the gas flows from the circumference towards the discharge. The diameter of the said bottom end is important and is as small as possible compatibly with preventing the discharge from striking to it. The tip of the top electrode is situated in the frusto-conical space, so that when the discharge is running steadily it does not strike to the walls of this space, as it might if these were vertical. With this arrangement it is possible to direct the flow of gas in the flat cylindrical zone so as to apply the pinch effect to the discharge in very efficient manner.

The size and shape of the nozzle can be varied depending on the flow rates. Preferably the flow rate is not substantially less than that of sound. The nozzle may be cylindrical but preferably is of convergent divergent type in order to afford high Mach numbers. If desired tapering nozzles of convergent or divergent type may be used for sonic velocities.

A suitable form of apparatus for conducting the process is shown in FIGURE 1 of the accompanying drawings. 1 is a chamber with wall 7 in which the discharge is formed by means of an anode 4, which is movable vertically, and 2 is the reaction chamber into which the products of the discharge are jetted at high velocity through the nozzle 6, which in this case, for reasons of convenience, is situated in the cathode 5. The gas to be subjected to the electric discharge is admitted through the annular channel 10, and may also sometimes be introduced through the tube 13 if desired. The other reactant or reactants are introduced to the reaction chamber 2 by the delivery tube 15.

The anode assembly 3, in which anode 4 is set, may be of any conducting metal which is heat resistant and is cooled by means of a coolant such as water circulated by pipe 14 and taken off by a pipe situated near the top of the assembly (not shown).

The pinch effect is applied in the zone 9 formed by the lower central surface of the constriction cap 11 and the upper surface of the cathode 5. Gas enters the zone 9 from the annular space 10 and is directed on to the discharge in the region immediately before the discharge products enter the nozzle 6. In the form shown, the upper surface of the nozzle 6 and the lower surface of the constriction plate 11 form the flat cylindrical space 9. The cap 11 has a frusto-conical cavity 8 in which the discharge occurs, and a central hole 16 through which it passes; and is held parallel to and above the top surface of the cathode 5 by the annular distance piece 12 provided with slots 17 for passage of the inlet gas. The depth of the cylindrical zone 9 can be adjusted by varying the thickness of the distance piece 12, and preferably should be similar in magnitude to the diameter of the nozzle.

Operation using direct current is as follows. The arc is struck by lowering the anode 4 through the hole in the metal plate until the nozzle 6 is touched, and the anode is then withdrawn to its normal operating position. The anode assembly 3 is provided with a gas inlet pipe 13 to the chamber 1 for passing a small flow of a gas inert to the upper electrode for its protection. For example, when the discharge products of air using a tungsten anode tip are jetted into the reaction chamber to produce nitric oxide, the blanketing gas may be nitrogen.

The process is applicable to the production of:
(1) Nitric oxide by jetting nitrogen into oxygen, or air into an otherwise empty reaction chamber;
(2) Hydrogen cyanide by jetting nitrogen into a hydrocarbon such as methane, ethane or propane; and
(3) Hydrazine by jetting nitrogen into ammonia.

*Example*

This relates to the production of hydrogen cyanide by jetting a nitrogen discharge into methane. Using the apparatus above described, nitrogen was fed at 50 to 120 litres/hour through the space 10 and was jetted through the nozzle 6 into methane fed to the reaction chamber 2 at the same rate (both measured at standard temperature and pressure). The discharge was run at 150 to 350 volts and 0.6 to 2 amps.

Runs were conducted (I) in which there was no pinch effect and (II) in which the pinch was applied to the discharge by inserting the constriction cap 11 in the way shown. The results obtained are given in FIGURE 2 of the accompanying drawings, in which the ordinates represents litres of HCN/cubic metre of $N_2$ and the abscissae, kilowatt hours/cubic metre of $N_2$.

It is seen that operating according to (II) there is approximately 50% improvement in the yield of hydrogen cyanide over (I) when the power consumption is about 2 kwh./m.³ of nitrogen.

Operation of the process and apparatus with a cooled electrode and an electrode having an internal nozzle has been described using direct current. However, they can also be operated similarly using alternating current, differences of detail being obvious to those skilled in the art. Moreover, when using either D.C. or A.C. both electrodes can have internal nozzles leading to a reaction zone or reaction zones, and a pinch effect can be applied in a similar way in close proximity to each nozzle, the distance between the electrodes being kept small. Alternatively with a still smaller distance between the electrodes a single pinch effect may be applied. When A.C. is used both the electrodes wear at substantially the same rate.

In another form of the invention applicable to both D.C. and A.C. operation, there may be a central electrode (which can be water-cooled if desired) and situated near or around it several, e.g. 2, 3 or 4 electrodes, each provided with an internal nozzle, there being a suitably shaped discharge space for each latter electrode and means in close proximity to each for applying the pinch effect.

We claim:

1. A method for conducting gaseous reactions comprising: establishing an electric arc discharge between a pair of electrodes at least one of which has an internal nozzle; feeding a gas radially inwardly toward said discharge peripherally of the discharge at the entrance to said nozzle; continuously applying an axially directed pinching force to said gas immediately prior to its contact with said discharge to increase the temperature of said gas; communicating the pinched gas with said discharge to actuate the gas; and jetting the actuated gas through said nozzle.

2. A method as set forth in claim 1 further comprising communicating said actuated gas issuing from said nozzle with a gaseous reactant, and collecting the products of the reaction.

3. Apparatus for conducting gaseous reactions comprising: a first electrode, means defining an electric arc discharge chamber housing said first electrode; means defining an opening in said chamber opposite said first electrode; means defining a reaction chamber adjacent said electric arc discharge chamber; means defining an opening in said reaction chamber aligned with said electric arc discharge chamber opening; a second electrode mounted in the reaction chamber opening; means defining a nozzle through said second electrode which communicates with said reaction chamber; means defining a narrow gap between said electric arc discharge chamber and said reaction chamber; means for directing a gas radially inwardly through said gap peripherally of said nozzle whereby the gas is pinched in the narrow gap and its temperature thus increased immediately prior to contact with the electric arc passing between said electrodes and being jetted into said reaction chamber through said nozzle.

4. Apparatus as set forth in claim 3 wherein said electric arc discharge chamber opening is convergent toward said gap and wherein said gap is substantially narrower peripherally of said electric arc discharge chamber opening and said nozzle.

5. Apparatus as set forth in claim 3 further including means for introducing a reactant gas into said reaction chamber for reaction with the products entering said reaction chamber through said nozzle.

6. Apparatus as set forth in claim 3 further including means for introducing a gas into said electric arc discharge chamber.

References Cited by the Examiner
UNITED STATES PATENTS

| 1,895,489 | 1/33 | Ruben | 204—179 |
| 2,860,094 | 11/58 | Ishizuka | 204—164 |
| 2,951,143 | 8/60 | Anderson et al. | 204—328 |
| 3,005,762 | 10/61 | Fenn | 204—164 |

WINSTON A. DOUGLAS, *Primary Examiner.*

JOHN R. SPECK, JOHN H. MACK, *Examiners.*